May 3, 1927.
C. E. DE WITT
1,627,152
BURNISHING AND REFITTING TOOL FOR BEARINGS
Filed Dec. 20, 1923
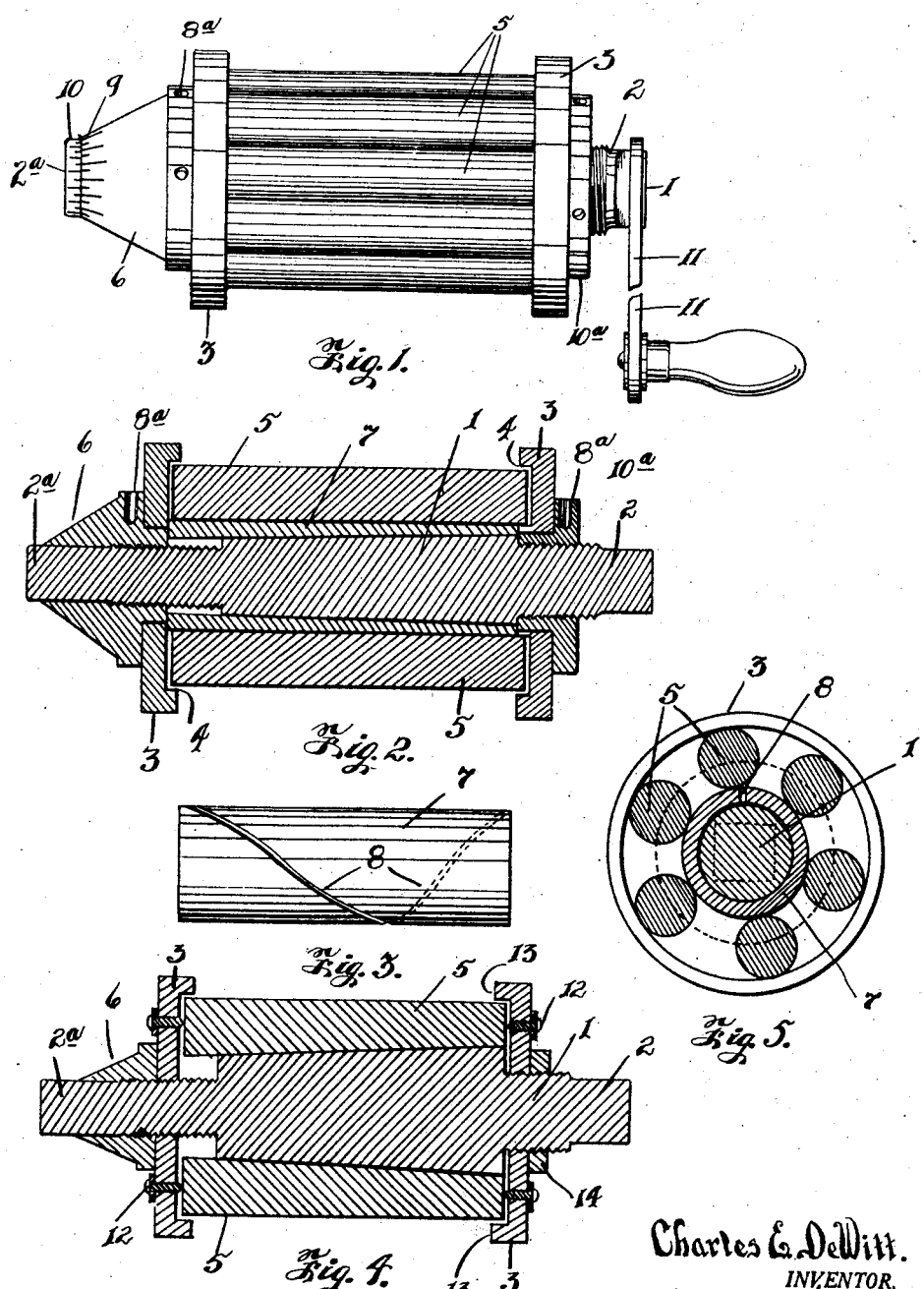
Charles E. DeWitt.
INVENTOR.
BY John M. Spellman
ATTORNEY Patented May 3, 1927.

1,627,152

UNITED STATES PATENT OFFICE.

CHARLES E. DE WITT, OF DALLAS, TEXAS, ASSIGNOR TO V. H. BARWOOD MANUFACTURING CO., OF LYNN, MASSACHUSETTS, A CORPORATION OF MASSACHUSETTS.

BURNISHING AND REFITTING TOOL FOR BEARINGS.

Application filed December 20, 1923. Serial No. 681,895.

This invention relates to tools used in metal working and in that connection it relates more particularly to a device for refitting and burnishing vehicle motor bearings and the like.

An object of the invention is to provide a device as outlined which will wear away the metal in the process of enlarging a bore or recess, in various parts of machinery, or in enlarging, refitting and smoothing a bearing in motor vehicles, instead of cutting it by revolving knives as is customarily done. The invention thus insures a more accurate means for accomplishing its purpose. The invention is particularly useful in working soft metals such as aluminum, Babbitt and the like, as where knives are used, any rough or blunted portion of the blades makes a pitted and scarred surface.

The improved device embodying the invention will be clearly understood by reference to the following description taken in connection with the accompanying drawings forming part hereof and in which:—

Figure 1 is a side elevational view of the device.

Figure 2 is a longitudinal sectional view, with the handle removed.

Figure 3 is a detail side view of the expansible sleeve which bears against the rollers.

Figure 4 is a longitudinal sectional view of the device and illustrating a modification thereof; and Figure 5 is a cross-sectional view of the device as illustrated in Figure 1.

Continuing the description of the invention, and referring to the several parts in detail; the device has a shaft 1, threaded at its ends 2 and $2^a$ and provided with end members 3—3. These end members have annular grooves 4—4 wherein are arranged to ride a plurality of rollers 5—5 and which bear against the metal to be worked upon.

In Figure 2 the shaft 1 is clearly shown, and is somewhat conical in shape and upon one end $2^a$, is screwed a nut 6 of a conical formation and which is passed through the end member 3. This nut 6 has its end member resting against a sleeve 7, clearly shown in Figure 3, the inside diameter of the sleeve being graduated to conformably receive the cone shaped shaft 1. The sleeve has a spiral groove 8 around its body from end to end for the purpose of making it resilient, so that when pressure is brought against it by inserting a pin in holes $8^a$ and advancing the nut 6, the sleeve will be pressed outward against the rollers 5—5. The nut 6, as will be seen by reference to Figure 1, has a scale 9, adapted to register with a like scale 10 on the end $2^a$ of the shaft 1, by means of which an accurate setting of the tool may be had. Another nut $10^a$ on the end 2 of the shaft is also provided for moving the sleeve against the rollers at this end. Both nuts 6 and $10^a$ have oppositely arranged threads to prevent their unscrewing when the device is in operation. The opposite end 2 of the shaft is squared for a handle 11.

In Figure 4 is illustrated a modification of the device. In this form the shaft 1 is larger and the rollers 5—5 are of larger diameter at one end, to conformably bear against the shaft. No sleeve is provided in this case, and the rollers are secured by small adjusting screws 12 to the end members 3—3, to retain them on an even axis. The end members 3—3 have flanges 13—13 against which the rollers bear. A nut 14, when retracted, will permit nut 6 to be advanced, thus moving the end $2^a$ outward and pressing the shaft against the rollers 5.

In operation, the device is placed in a bearing by separating the two parts of the bearing and the nuts moved to proper adjustment for the bearing to be worked upon. The handle 11 is then turned which will cause the shaft to rotate and will rotate the rollers against the metal. The action of the rollers is to wear away the metal in a smooth, uniform and neat manner.

What is claimed is:

1. A device for burnishing, refitting and gauging bearings of Babbitt or other soft metals, including a tapered mandrel having integral threaded end portions; a series of elongated rollers spaced around the mandrel; centrally apertured circular plates having inwardly facing annular channels therein, disposed on either end of said mandrel and receiving the ends of the rollers in said channels; an elongated, expansible sleeve slidable over the tapered body of said mandrel; a nut disposed on the threaded portion of one end of the mandrel and having a flange thereon extending through the bore of one of said circular plates and impinging one end of said expansible sleeve, and means on one end of said mandrel for gauging the action of the rollers on the bearing.

2. A device for refitting, burnishing and gauging bearings of the soft metal type including a mandrel having a tapered body portion and integral threaded end portions, a plurality of elongated rollers radially disposed around said mandrel; means for holding the rollers in alinement, one with the other, included with means for increasing and decreasing the burnishing diameter of the rollers; means for determining the burnishing action of said rollers on a bearing and means on one end of said mandrel for applying an operating handle thereto.

3. A burnishing tool having, in combination, a mandrel having threaded end portions, a cage through which the mandrel extends comprising end plates, a plurality of burnishing rolls movably confined between the end plates, a nut threaded on each threaded end of the mandrel, and means whereby the rolls are adapted to be moved outward and inward when the mandrel is longitudinally adjusted through the cage in opposite directions.

4. A burnishing tool having, in combination, a tapered mandrel having threaded end portions, a cage through which the mandrel extends comprising annular end plates, a plurality of burnishing rolls movably confined between the end plates, and a nut threaded on each threaded end of the mandrel, adjustment of the nuts being adapted to effect longitudinal adjustment of the mandrel through the cage in opposite directions, whereby the rolls are adapted to be moved outward and inward when the mandrel is longitudinally adjusted through the cage in opposite directions.

In testimony whereof I have signed my name to this specification.

CHARLES E. DE WITT.